United States Patent
Christner et al.

(10) Patent No.: US 11,770,434 B1
(45) Date of Patent: Sep. 26, 2023

(54) COMPRESSION ON-DEMAND IN A STREAM DATA PLATFORM

(71) Applicant: Dell Products L.P., Round Rock, TX (US)

(72) Inventors: Joel Christner, El Dorado Hills, CA (US); Raul Gracia, Barcelona (ES); Rômulo Teixeira De Abreu Pinho, Niterói (BR); Vinicius Michel Gottin, Rio de Janeiro (BR)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/047,486

(22) Filed: Oct. 18, 2022

(51) Int. Cl.
*H04L 65/80* (2022.01)
*H04L 65/75* (2022.01)

(52) U.S. Cl.
CPC ............ *H04L 65/764* (2022.05); *H04L 65/80* (2013.01)

(58) Field of Classification Search
CPC ....... H04L 65/764; H04L 65/80; H04L 69/04; H04L 67/5651; H03M 7/30; H04B 5/0031
See application file for complete search history.

(56) References Cited

U.S. PATENT DOCUMENTS

| | | |
|---|---|---|
| 9,450,603 B2 | 9/2016 | Dickie |
| 9,503,123 B1 | 11/2016 | Pinho et al. |
| 9,558,566 B2 | 1/2017 | Charikar et al. |
| 9,660,666 B1 | 5/2017 | Ciarlini et al. |
| 9,898,375 B1 | 2/2018 | Fricker |
| 9,935,652 B1 | 4/2018 | Chalmer et al. |
| 9,954,550 B1 | 4/2018 | Ciarlini et al. |
| 9,973,210 B1 | 5/2018 | Mahony et al. |
| 10,044,370 B1 | 8/2018 | Pasha et al. |
| 10,103,745 B1 | 10/2018 | Rodrigues et al. |
| 10,122,379 B1 | 11/2018 | Ciarlini et al. |
| 10,133,551 B1 | 11/2018 | Ciarlini et al. |
| 10,153,779 B1 | 12/2018 | Bordignon et al. |
| 10,169,359 B1 | 1/2019 | Pinho et al. |
| 10,200,060 B1 | 2/2019 | Ciarlini et al. |
| 10,235,134 B1 | 3/2019 | Dangi et al. |
| 10,452,616 B1 | 10/2019 | Bassov et al. |

(Continued)

OTHER PUBLICATIONS

Apache Pulsar, https://streamnative.io/en/blog/tech/2021-01-14-pulsar-architecture-performance-tuning/ (accessed Jun. 2022).

(Continued)

*Primary Examiner* — Oanh Duong
(74) *Attorney, Agent, or Firm* — Workman Nydegger

(57) ABSTRACT

One example method includes receiving stream data batches at a client node. The client node determines if the stream data batches are compressible. For the compressible stream data batches, a request is sent to a server node for an on-demand stream compression service, the request including an indicator of a stream data type for the compressible data batches. The on-demand stream compression service is deployed and launched at the client node. The on-demand stream compression service includes a compressor pool of compressors that are able to compress the stream data type of the compressible stream data batches. A compressor of the compressor pool is selected and used to compress the compressible stream data batches. The compressed stream data batches are sent to the server node.

20 Claims, 9 Drawing Sheets

(56) References Cited

U.S. PATENT DOCUMENTS

| | | | |
|---|---|---|---|
| 10,505,563 | B1 | 12/2019 | Gonczi et al. |
| 10,509,676 | B1 | 12/2019 | Bassov et al. |
| 10,585,856 | B1 | 3/2020 | Bigman |
| 10,666,289 | B1 | 5/2020 | Sofia et al. |
| 10,749,546 | B1 | 8/2020 | Sun et al. |
| 10,762,667 | B2 | 9/2020 | Mekuria |
| 11,068,405 | B2 | 7/2021 | Armangau et al. |
| 11,647,103 | B1* | 5/2023 | Pinho ............ H04L 69/04 709/224 |
| 2005/0265585 | A1 | 12/2005 | Rowe |
| 2005/0265586 | A1 | 12/2005 | Rowe et al. |
| 2005/0271258 | A1 | 12/2005 | Rowe |
| 2011/0163163 | A1 | 7/2011 | Rowe |
| 2014/0379866 | A1 | 12/2014 | Perlman et al. |
| 2015/0205992 | A1 | 7/2015 | Rowe |
| 2016/0014437 | A1 | 1/2016 | Perlman et al. |
| 2017/0235497 | A1 | 8/2017 | Shih |
| 2018/0067679 | A1 | 3/2018 | Adrianus et al. |
| 2018/0234110 | A1 | 8/2018 | Kaldewey et al. |
| 2018/0367161 | A1* | 12/2018 | Ki ............ H03M 7/6088 |
| 2020/0134048 | A1 | 4/2020 | Faibish et al. |
| 2020/0341668 | A1 | 10/2020 | Gonczi et al. |
| 2020/0341670 | A1 | 10/2020 | Zhang et al. |
| 2020/0348957 | A1 | 11/2020 | Krasner et al. |
| 2020/0348959 | A1 | 11/2020 | Krasner et al. |
| 2021/0011648 | A1* | 1/2021 | Reineke ............ G06F 3/0605 |
| 2021/0027115 | A1 | 1/2021 | Davis et al. |
| 2021/0281491 | A1 | 9/2021 | Yelahanka et al. |
| 2022/0129190 | A1 | 4/2022 | Bassov et al. |
| 2022/0171555 | A1* | 6/2022 | Ponnuswamy ..... H03M 7/6064 |
| 2022/0294470 | A1 | 9/2022 | De et al. |

OTHER PUBLICATIONS

Harwath, D., & Glass, J. (2015). Deep Multimodal Semantic Embeddings for Speech and Images. 237-244, 8 pages.

IBM-MQ, https://www.ibm.com/docs/en/ibm-mq/9.1?topic=applications-channel-compression-in-mq-classes-java (accessed, Jun. 2022).

J.-I. Gailly and M. Adler, "Gzip," 2003, 1 page.

Kafka, https://www.conduktor.io/kafka/kafka-message-compression (accessed Jun. 2022).

Kooten, P. van. (2019). shrynk—Using Machine Learning to learn how to Compress. Retrieved Dec. 11, 2019, from https://vks.ai/2019-12-05-shrynk-using-machine-learning-to-learn-how- to-compress.

Lin, T. Y., Maire, M., Belongie, S., Hays, J., Perona, P., Ramanan, D., Dollar, P., & Zitnick, C. L. (2014). Microsoft COCO: Common objects in context. Lecture Notes in Computer Science (Including Subseries Lecture Notes in Artificial Intelligence and Lecture Notes in Bioinformatics), 8693 LNCS(PART 5), 740-755. 16. pages.

M. Isenburg and P. Alliez, "Compressing polygon mesh geometry with parallelogram prediction," in IEEE Visualization, 2002. VIS 2002., Nov. 2002, pp. 141-146., 6 pages.

M. Mahoney, "Paq8," 2007, 9 pages.

Murashko, 0. (2018). Using Machine Learning to Select and Optimise Multiple Objectives in Media Compression. PhD Thesis. University of St Andrews. Retrieved from http://research-repository.st-andrews.ac.uk/.

P. Lindstrom and M. Isenburg, "Fast and efficient compression of floating-point data." IEEE transactions on visualization and computer graphics, vol. 12, No. 5, pp. 1245-1250, 2006, 7 pages.

Palov, "7-zip is a file archiver with a high compression ratio," 2016, 2 pages.

Pinho et al.; U.S. Appl. No. 17/305,112, filed Jun. 30, 2021.

RabbitMQ, https://www.rabbitmq.com/clustering-compression.html (accessed Jun. 2022).

Sneyers, J., & Wuille, P. (2016). FLIF: Free lossless image format based on MANIAC compression. In 2016 IEEE International Conference on Image Processing (ICIP) (pp. 66-70). IEEE.

Y. Collet, "Lz4," 2017, 12 pages.

Z. Tarantov, "Snappy," 2011, 2 pages.

* cited by examiner

US 11,770,434 B1

COMPRESSION ON-DEMAND IN A STREAM DATA PLATFORM

FIELD OF THE INVENTION

Embodiments of the present invention generally relate to data compression. More particularly, at least some embodiments of the invention relate to systems, hardware, software, computer-readable media, and methods for compression on demand in a stream data platform.

BACKGROUND

Data compression is relevant and useful for a variety of reasons. When data compression is performed, data is compressed at the source and the compressed data is transmitted to the destination. The data may be decompressed at the destination. Compressing data can conserve bandwidth. If data is compressed to half of its original size, the data can potentially be transmitted twice as fast to its destination.

Compression, however, is only beneficial when performed efficiently. For example, if the process of compressing data adds substantial time to the overall transmission process, then compressing the data may not be beneficial or improve overall performance. Decompressing the data may also add to the overall transmission time.

Compression/decompression can also be impacted by the availability of compression algorithms because compressing data with any available compression algorithm may not be the best approach. However, rather than seeking the best compression algorithm for specific data, data compression is often performed using pre-defined or generic compression algorithms that are indiscriminately applied to the data prior to transmission.

When transmitting data to a destination, both the transmitting and receiving ends of the communication must agree on and install the necessary compression/decompression components. This can be difficult because this requires several compression algorithms to be available to the application or installed on the device where the application is deployed and compression is desired. The corresponding decompression algorithms must be available at the destination.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
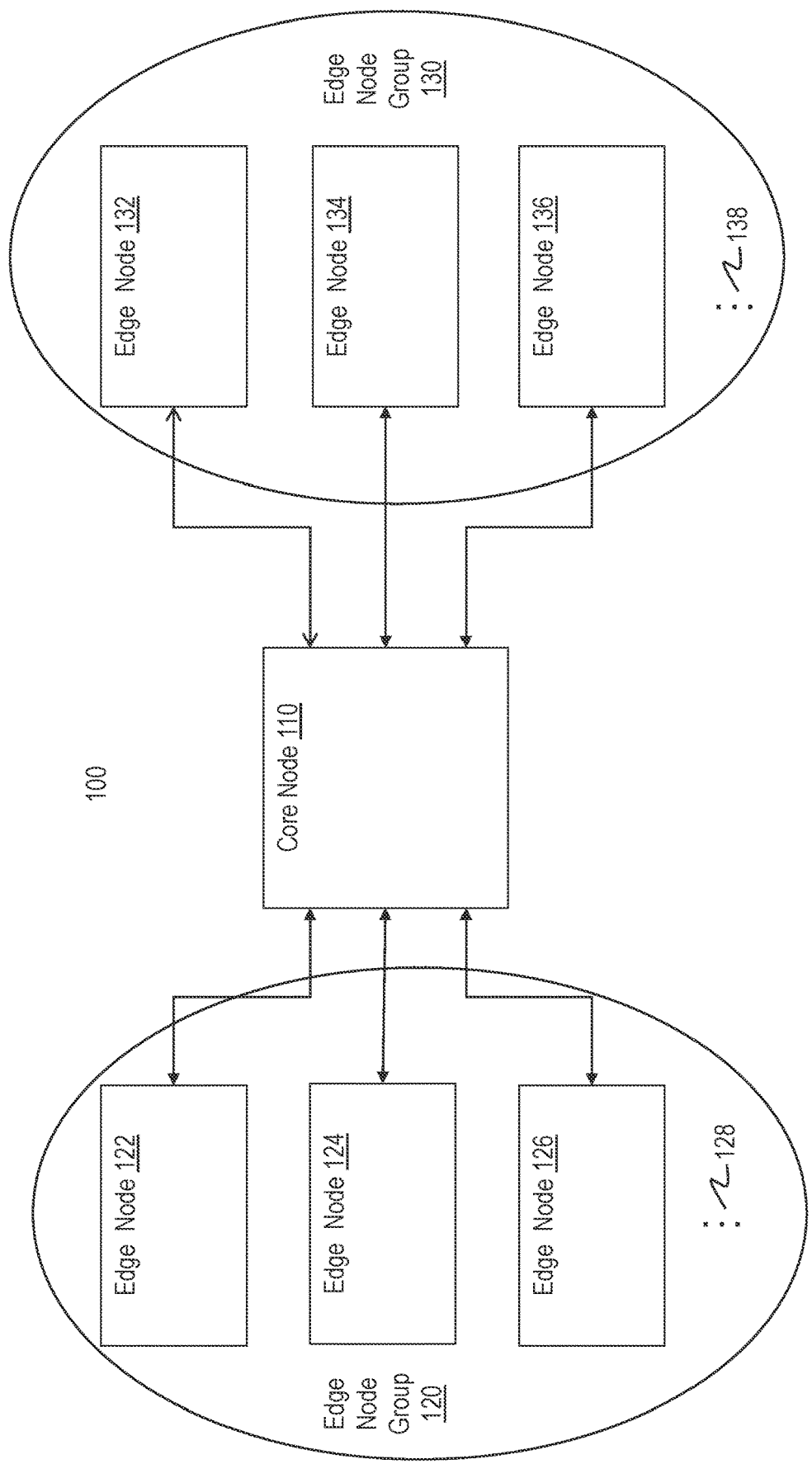
FIG. 1 discloses aspects of a network where a stream data platform may be implemented.

Embodiments of the present invention generally relate to data compression. More particularly, at least some embodiments of the invention relate to systems, hardware, software, computer-readable media, and methods for compression on-demand in a stream data platform.

Data compression and data decompression can provide several advantages. Compressing data, for example, can reduce network bandwidth requirements and may improve transmission performance. The performance improvement may depend on how much the data can be compressed—the compression ratio.

The effectiveness of a compression algorithm may depend on the content and context of the data. In fact, the best compressor for data can change according to content (characteristics of the data) and context (intended application). Compressors that are aware of the data type (e.g., audio, images, documents) have an understanding of the data and may achieve better compression ratios than generic compressors. When transferring data (e.g., from a source node to a remote node), higher compression ratios may improve the performance of the operations, particularly when the bandwidth is limited.

Compression is also beneficial when it does not add material time to the compression/decompression activities. As a result, selecting a compressor may also depend on the context. For example, data movement operations may consider compression and/or decompression speeds in addition to the data types the compressor has knowledge of when selecting a compressor. In some instances, compression may not be performed if efficiency or other service level agreement (SLA) requirements cannot be satisfied. Consequently, the compression algorithm selected for specific data may depend on the content or characteristics of the data, the intended application or context, and SLA constraints.

Embodiments of the invention relate to an architecture or framework for providing compression on demand in a streaming platform, particularly at a client node that receives and/or produces the streaming data. Embodiments of the invention provide mechanisms for the client node to determine the compressibility of the incoming streaming data. When compression is deemed beneficial by the client node, embodiments of the invention provide mechanisms for the client node to request that a server node deploy a content, context, and/or SLA aware compression service at the client node, along with a pool of compressors that are configured to compress the type of data comprising the stream data. Embodiments of the invention provide mechanisms for the compression service, which may be implemented as virtual network engine deployed at the client node, to select the best compressor of the pool of compressors given the content, context, and/or SLA of the stream data and then to compress the stream data and provide the compressed stream data to the server node.

Embodiments of the current invention also provide mechanisms for the server node to implement the compression service, which may be implemented as virtual network engine deployed at the server node. Upon receipt of the request from the client node to deploy the compression service, the server node is able to select a subset of compressors from an overall pool of compressors that are configured to compress the type of data comprising the stream data and to send to the client node these compressors when deploying the service at the client node. Embodiments of the invention provide mechanisms for the server node to decompress the received compressed stream data and to provide other data management services such as providing the decompressed stream data to other data consumers.

The architecture or framework of the invention provides the technical benefit of only providing the compression service to the client node when it is determined that the stream data is compressible. If the stream data is not of a type that would benefit from being compressed, then no compression occurs. This saves on computing resource overhead at the client node as there is no need to store compressors that are not needed, thus leaving the resources for other processes at the client node. This is especially helpful given high throughput that is typically associated with stream data. In addition, when compression is beneficial, since the server node only provides those compressors that are configured for the type of the stream data rather than the total compressor pool, additional computing resource overhead is saved.

Embodiments of the invention are discussed in the context of a compression system. However, the compression system disclosed herein may also perform data decompression. Thus, the compression system may be configured to perform data compression, data transmission, and/or data decompression.

FIG. 1 discloses aspects of a network 100 where a stream data platform may be implemented. The network 100 may include networks such as the Internet, telecommunications networks, local area networks, edge networks, near-edge networks, wide area networks, or the like or combinations thereof.

The network 100 includes an edge node group 120, which includes an edge node 122, an edge node 124, an edge node 126, and any number of additional edge nodes as represented by the ellipses 128. The network 100 also includes an edge node group 130, which includes an edge node 132, an edge node 134, an edge node 136, and any number of additional edge nodes as represented by the ellipses 138.

The edge nodes of the edge node groups 120 and 130 are configured to communicate with a core node 110 using any reasonable network communication protocols and methods. The core node 110 may be a server or other structure providing processing and networking capabilities. In particular, the core node 110 may be configured to deploy compression/decompression services on demand to the edge nodes when requested by the edge nodes.

In one embodiment, one or more of the edge nodes of edge node groups 120 and 130 receive and/or generate streaming data. The streaming data may be of various types including, but not limited to, audio data, video data, sensor data, image data, documents, files, or like or any combination thereof. Thus, the edge node may desire compression/decompression services on demand when needed. That is, when the edge node determines that the received and/or generated streaming data (or at least a portion thereof) is compressible, the edge may request that the core node provide compression services to the node based on the type of the received and/or generated streaming data.

The core node, in response to the request, is configured to provide a compression service that is configured to perform content based, context based, and SLA oriented compression operations on the stream data. A protocol and framework for providing compression on demand as a service is disclosed in U.S. patent application Ser. No. 17/648,000 entitled COMPRESSION-AS-A-SERVICE FOR DATA TRANSMISSIONS and filed Jan. 14, 2022, which is incorporated herein by reference in its entirety. Performing content based, context based, and SLA oriented compression procedures are disclosed in U.S. patent application Ser. No. 17/199,914 entitled PROBABILISTIC MODEL FOR FILE-SPECIFIC COMPRESSION SELECTION UNDER SLA-CONSTRAINTS and filed Mar. 12, 2021, and U.S. patent application Ser. No. 17/305,112 entitled PROBABILISTIC MODEL FOR FILE-SPECIFIC COMPRESSION SELECTION UNDER SLA-CONSTRAINTS and filed Jun. 30, 2021, both of which are herein incorporated by reference in their entirety.

Figure 2A:
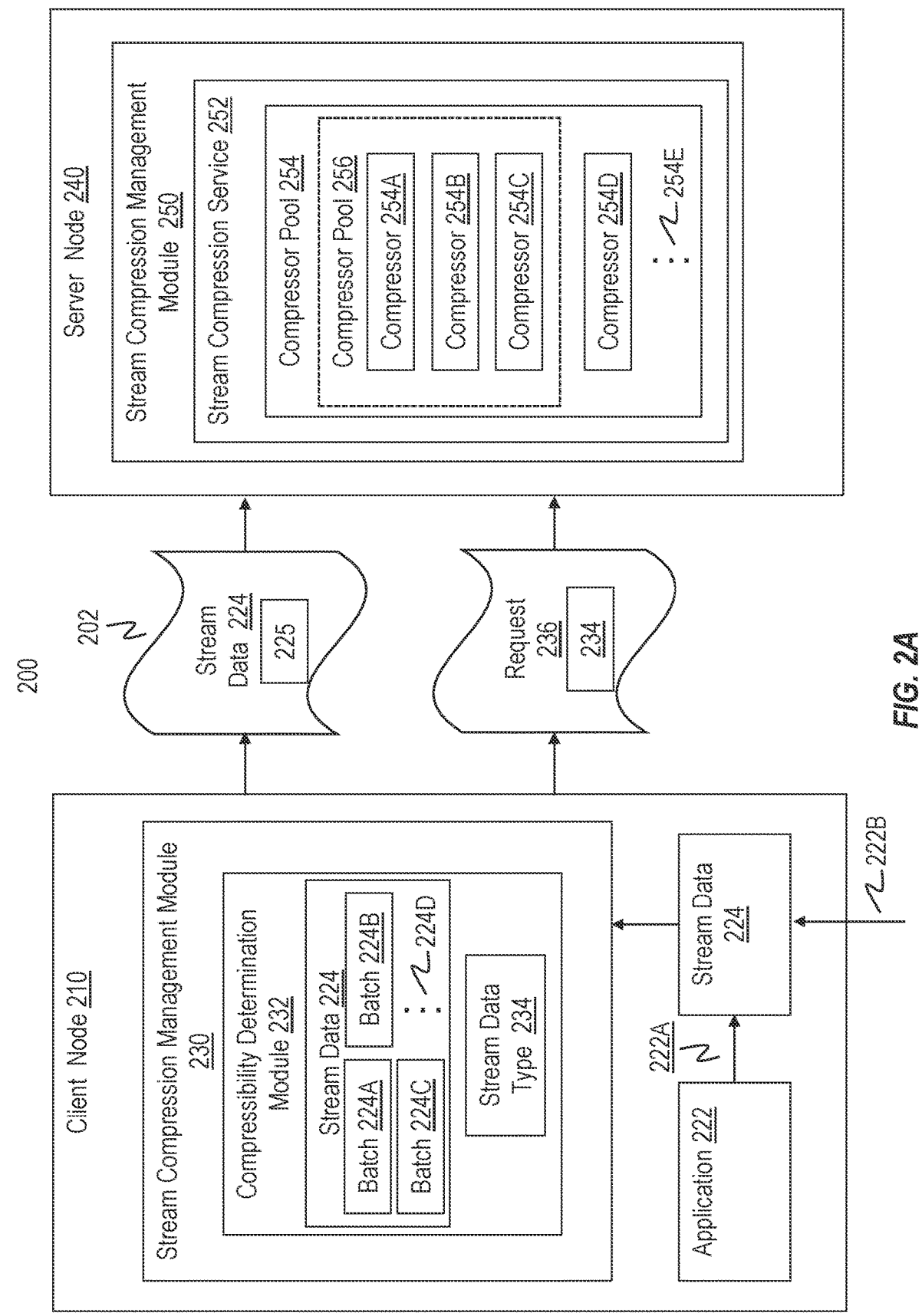
FIGS. 2A-2C illustrate an embodiment of a stream data platform that is configured to implement a stream compression system on demand at a client node.

FIG. 2A illustrates an embodiment of a stream data platform 200 that is configured to implement a stream compression system on demand at a client node. As illustrated, the streaming platform includes a client node 210. The client node 210 may correspond to the one of the edge nodes 122, 124, 126, 132, 134, or 136, although this is not required as the stream data platform 200 may be implemented in any number of computing system networks, architectures, or frameworks. Although FIG. 2A only illustrates one client node 210, it will be appreciated that this is for ease of explanation only and that there may be any number of additional client nodes that may be part of the stream data platform 200. Thus, the description of the operation of the client node 210 may apply to the non-illustrated additional client nodes.

The client node 210 includes an application 222, which is configured to generate a stream of data 224 (also referred to herein as "stream data 224) as shown at 222A. For example, the application 222 may be an application that generates sensor stream data, audio stream data, video stream data, image stream data, or any other type of stream data, or combinations thereof. In some embodiments, the client node 210 receives the stream data 224 from a source that is not part of the client node 210 such as an application that is part of another client node as shown at 222B. In still other embodiments, the stream data 224 is generated by the application 222 and is also received by the source that is not part of the client node 210.

In some embodiments, a stream compression management module 230 or an entity that generated the stream data, segments the stream data 224 into the various batches or segments, each of which has a start point and an end point. For example, the stream data 224 may be segmented into a stream data batch 224A, a stream data batch 224B, a stream data batch 224C, and any number of additional stream data batches as illustrated by the ellipses 224D.

The client node 210 includes the stream compression management module 230 that is configured in operation to provide management services for compressing the stream data 224 as needed. At an initial stage when compression is not yet available (or any later stage when compression is becomes unavailable), the stream compression management module 230 sends the stream data 224 in an uncompressed format to a server node 240. The operation of the server node 240 will explained in more detail to follow.

The stream compression management module 230 includes a compressibility determination module 232. In operation, the compressibility determination module 232 is configured to determine the compressibility of the stream data 224. That is, the compressibility determination module 232 determines if the stream data 224 is compressible or not. The compressibility of the stream data 224 may be identified by any reasonable method including, but not limited to, efficient test such as entropy over stream samples, compression of stream samples with a reference compressor, or the discovery of repeated stream patterns over time. Accordingly, the embodiments and claims disclosed herein are not limited by the particular method that is used to determine the compressibility of the stream data.

In the case that the compressibility determination module 232 determines that the stream data 224 is not compressible or would not otherwise benefit from being compressed, the stream compression management module 230 continues to send the stream data in the uncompressed format to the server node as shown at 202. In some embodiments, a flag or other indicator 225 is set to indicate that the stream data 224 is in the uncompressed format and is included in the stream data 224 to notify the server node 240 of the status of the stream data 224. For example, the flag 225 may be set to zero when the stream data 224 is sent in the uncompressed format. Because the flag 225 is set to zero, the server node 240 will determine that the received stream data 224 is not compressed and so the server node 240 will take no action to decompress the stream data 224 and will only provide other data services as will be explained in more detail to follow.

In the case that the compressibility determination module 232 determines that the stream data 224 is compressible or would otherwise benefit from being compressed, or determines that at least one of the batches 224A-224D is compressible or would otherwise benefit from being compressed, the compressibility determination module 232 determines a stream data type indicator 234 that identifies the stream data type of the stream data 224. For example, the stream data type indicator may identify the stream data as audio data, video data, sensor data, image date, or any other type of stream data or combination thereof. The stream compression management module 230 then sends a request 236 for an on-demand compression service that includes the stream data type indicator 234 to the server node 240. Advantageously, making the compression service only be available on-demand avoids using computing resource overhead when compression is not beneficial.

The stream data platform 200 includes the server node 240, which may correspond to the core node 110, although this is not required as the stream data platform 200 may be implemented in any number of computing system networks, architectures, or frameworks. The server node 240 includes a stream compression management module 250, which in operation is configured to control the deployment and use of an on-demand compression service for compressing stream data. As shown, the stream compression management module 250 includes an instance of a stream compression service 252 that is deployed at the stream compression management module 250 or other location on the server node 240. The stream compression service 252 may be a virtual service and may operate as a virtual machine or a container deployed at the server node 240.

The steam compression service 252 is configured with multiple compressors, each configured to perform a different compression algorithm. In one embodiment, the steam compression service 252 is provided with all compression algorithms available to the stream data platform 200. For example, the steam compression service 252 may be configured with a compressor pool 254 that includes a compressor 254A, a compressor 254B, a compressor 254C, a compressor 254D, and any number of additional compressors as illustrated by the ellipses 254E. In one embodiment, the compressor pool 254 includes all the compressors available to the stream data platform 200.

The request 236 is received by the stream compression management module 250 and the stream data type indicator 234 is extracted from the request. Based on the stream data type indicator 234, the stream compression management module 250 selects the compressors of the compressor pool 254 that are compatible with the stream data type of the one or more of the stream data batches 224A-224D. For example, if the stream data 224 or one of the stream data batches 224A-224D is video data, then a compressor that is configured to audio data would likely be of no use in compressing/decompressing the video data. Thus, in this case the stream compression management module 250 would only select those compressors of the compressor pool 254 that are either configured for compressing/decompressing video data or that are configured as generic compressors configured for compressing/decompressing all types of stream data.

In the embodiment of FIG. 2A, the stream compression management module 250 selects a compressor pool 256 which includes a subset of the compressor pool 254 that includes those compressors configured for compressing/decompressing video data or that are configured as generic compressors configured for compressing/decompressing all types of stream data. For example, the compressor pool 256 may include the compressors 254A, 254B, and 254C because these compressors are configured to compressing/decompressing video data and not include the compressors 254D and 254E because these compressors are not configured for compressing/decompressing video data. Although only three compressors are shown in the compressor pool 256, this is for ease of illustration only as there may be any number of additional compressors included in the compressor pool 256. Advantageously, only selecting those compressors that are configured for compressing/decompressing the data type of the stream data save on computing system overhead.

Figure 2B:
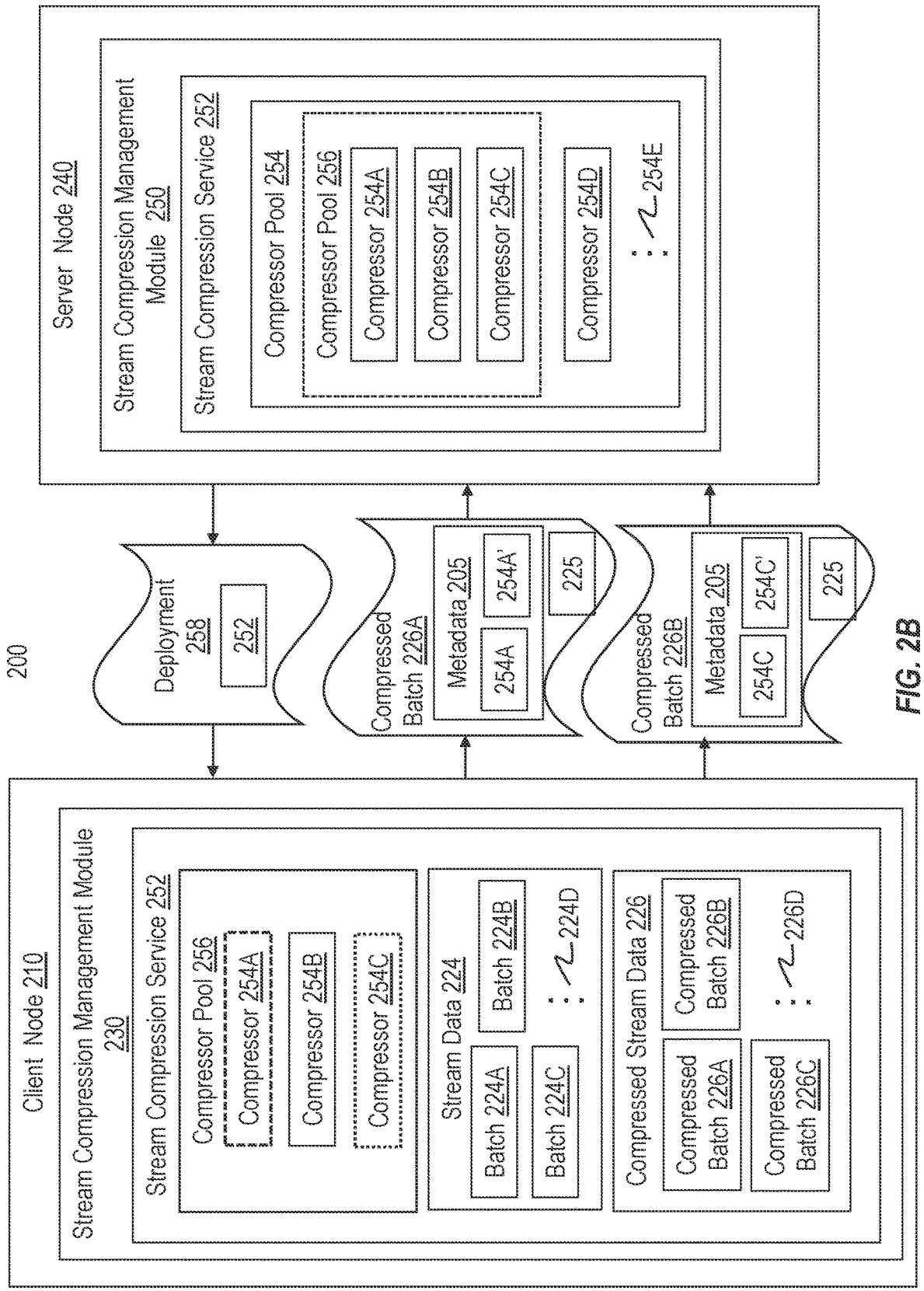

FIG. 2B illustrates an additional view of the embodiment of the stream data platform 200. For ease of illustration, not all of the elements shown in FIG. 2A are also shown in FIG. 2B. As illustrated in FIG. 2B, the stream compression management module 250 deploys an instance of the stream compression service 252 that includes the compressor pool 256 at the stream compression management module 230 of the client node 210 as shown by deployment 258. As mentioned previously, the stream compression service 252 may be a virtual service and may operate as a virtual machine or a container that is deployed at the client node 210.

Once the stream compression service 252 is deployed and launched at the stream compression management module 230, the stream compression management module 230 invokes the stream compression service 252 to compress the stream data 224 and/or to compress each of the stream data batches 224A-224D in those embodiments that have been segmented into batches, that are to be sent to the server node 240.

In operation, the stream compression service 252 selects the best compressor of the compressors in the compressor pool 256 for compressing the stream data 224 and/or each of the stream data batches 224A-224D. The best compressor will typically be the compressor that satisfies the content, context, and SLA requirements of the stream data 224 and/or each of the stream data batches 224A-224D. In some embodiments, the SLA requirements may be provided by an application that generated the stream data or the SLA requirements may be derived from how applications consume the stream data batches. More specifically, the compressor is selected based on one or more of the ability to conserve storage space/cost, speed of compression and/or decompression, cost of computation, overall time for data compression, data transmission, and data decompression, or the like or combination thereof. In one embodiment, the best compressor is selected from the compressor pool 256 using a small section or portion of the data to be compressed. It will be appreciated that there are numerous methods that the best compressor can be selected and thus the embodiments and claims disclosed herein are not limited by any particular method of selecting the best compressor.

The selected best compressor compresses the stream data 224 and/or each of the stream data batches 224A-224D. The stream compression service 252 then returns compressed stream data 226 along with metadata indicating the compressor that was selected and its compression parameters to the stream compression management module 230. As shown in FIG. 2B, in some embodiments the compressed stream data 226 includes a compressed stream data batch 226A corresponding to the stream data batch 224A, a compressed stream data batch 226B corresponding to the stream data batch 224B, a compressed stream data batch 226C corresponding to the stream data batch 224C, and potentially any number of additional compressed stream data batches illustrated by the ellipses 226D corresponding to the stream data batches 224D are retuned by the data compression service 252 along with the metadata indicating the compressor that performed the compression as well as its compression parameters. Although all of the stream data batches 224A-224D are shown as having been compressed into compressed stream data batches 226A-226D, this is for ease of illustration and need not be the case. In some embodiments, only a subset of the of the stream data batches may be determined to be compressible and so only these stream data batches will be compressed.

In the embodiment of FIG. 2B, the compressor 254A is selected as being the best for the compressor for the stream 224 including the stream data batch 224A as illustrated by the long dashed lines. Accordingly, the compressed stream data 226 including the compressed stream data batch 226A is returned to the stream compression management module 230. The stream compression data management module 230 packages the compressed stream data 226 including the compressed stream data batch 226A along with metadata 205 and the flag 225. The metadata 205 indicates that the compressor 254A was selected to compress the stream data 224 including the stream data batch 224A and also includes the compression parameters 254A' of the compressor 254A. In this instance, the flag 225 will be set to one since the compressed stream data batch 226A has been compressed.

FIG. 2B shows that different stream data batches of the same stream data may have different compressors selected as the best compressor fora given stream data batch. As previously described, the compressor 254A was selected as the best compressor for the stream data 224 including the stream data batch 224A. However, as shown in FIG. 2B, the compressor 254C is selected as being the best compressor for the stream data 224 including the stream data batch 224B as illustrated by the short-dashed lines. Although not illustrated, in some embodiments a different compressor than the compressors 254A and 254C may be selected to compress the stream data 224 including the stream data batch 224C or potentially the stream data batches 224D. In other embodiments, the same compressor may be selected to compress multiple stream data streams while other compressors are selected to compress other stream data streams. For example, the compressor 254A may be selected to compress the stream data 224 including the stream data batches 224A and 224C while the compressor 254C may be selected to compress the stream data 224 including the stream data batch 224B. Thus, the present invention provides a dynamic way for the best compressor to be selected for a given stream data.

The compressed stream data 226 including the stream data batch 226B is returned to the stream compression management module 230. The stream compression data management module 230 packages the compressed stream data 226 including the stream data batch 226B along with metadata 205 and the flag 225. The metadata 205 indicates that the compressor 254C was selected to compress the stream data 224 including the stream data batch 224B and also includes the compression parameters 254C' of the compressor 254C. In this instance, the flag 225 will be set to one since the compressed stream data 226 including the stream data batch 226C has been compressed. The packaged compressed stream data batches 226A and 226B are sent to the server node 240.

Figure 2C:
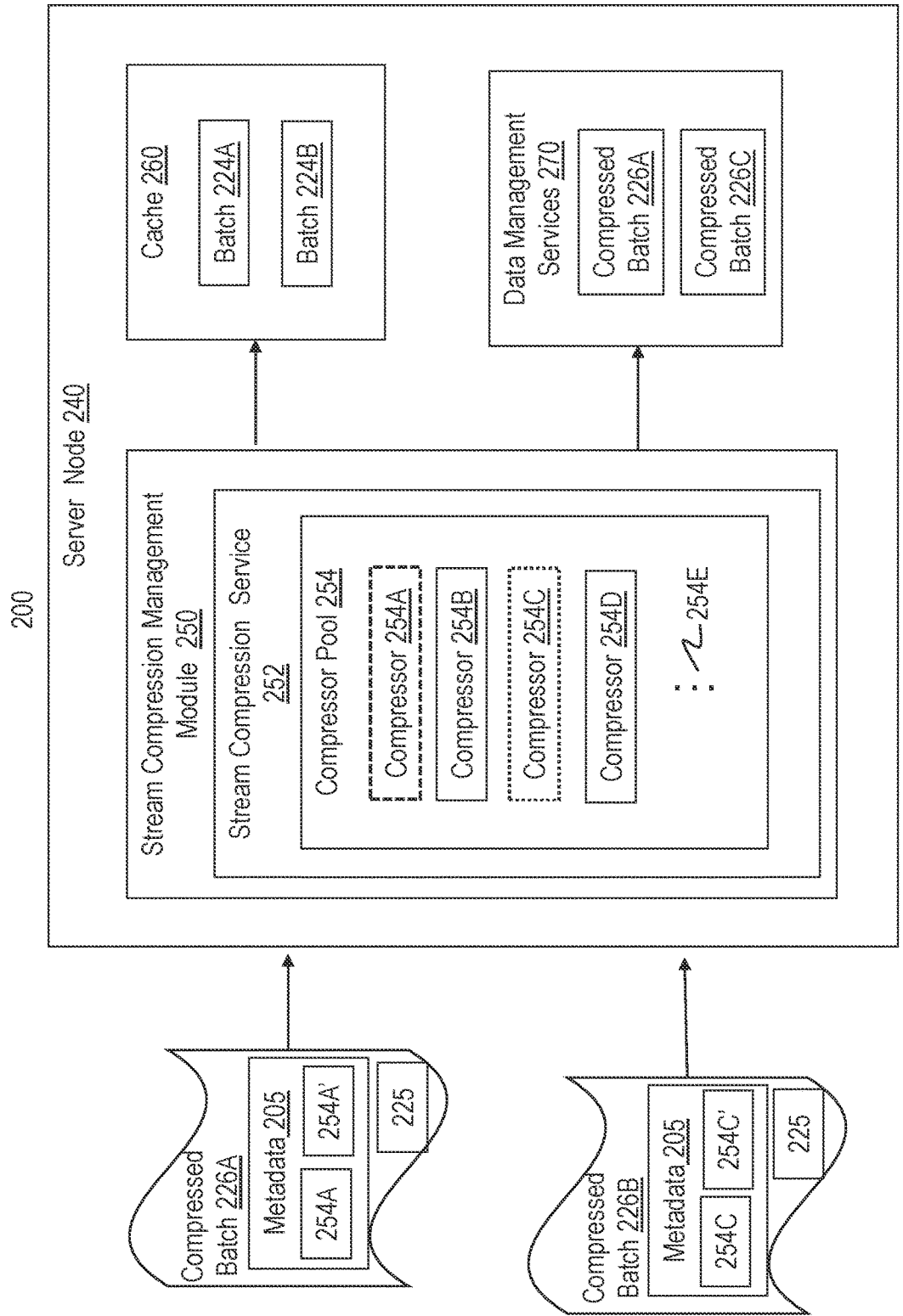

FIG. 2C illustrates an additional view of the embodiment of the stream data platform 200. For ease of illustration, not all of the elements shown in FIGS. 2A and 2B are also shown in FIG. 2C. As illustrated in FIG. 2C, when the packaged compressed stream data 226 including the stream data batch 226A is received, the stream compression management module 250 reads the flag 225 and determines that it is set to one, which indicates that the compressed stream data 226 including the stream data batch 226A has been compressed. In response, the stream compression management module 250 reads the metadata 205 and determines that the compressor 254A was used to compress the compressed stream data 226 including the stream data batch 226A and also obtains the compressor parameters 254A'. Since the compressor 254A is part of the compressor pool 254 of the compressor service 252 as previously described, the stream compression management module 250 is able to use the compressor 254A to decompress the compressed stream data 226 including the stream data batch 226A as shown by the long-dashed lines. It will be appreciated that since the client node 210 always requests the compression service 252 from the server node 240, the present invention ensures that the server node 240 will always have access to the specific compressor used at the client node to compress the stream data batch when decompressing the stream data batch.

Likewise, when the packaged compressed stream data 226 including stream data batch 226B is received, the stream compression management module 250 reads the flag 225 and determines that it is set to one, which indicates that the compressed stream data 226 including stream data batch 226B has been compressed. In response, the stream compression management module 250 reads the metadata 205 and determines that the compressor 254C was used to compress the compressed stream data 226 including stream data batch 226B and also obtains the compressor parameters 254C'. Since the compressor 254C is part of the compressor pool 254 of the compressor service 252 as previously described, the stream compression management module 250 uses the compressor 254C to decompress the compressed stream data 226 including stream data batch 226B as shown by the short-dashed lines.

As illustrated, the server node 240 includes a memory cache 260. In operation, the server node 240 stores the decompressed stream data in the memory cache 260. For example, FIG. 2C shows that the stream data 224 including the stream data batches 224A and 224B, which have been decompressed from the compressed stream data 226 including the stream data 224 including the stream data batches 224A and 224B, are placed in the memory cache 260. The stored stream data 224 including the stream data batches 224A and 224B are made available for applications to consume as needed. The server node 240 is thus able to efficiently manage queues and buffers to avoid latency issues deriving from the addition of a decompression step.

The server node also includes data management services 270, which represents other data management services within the server node 240. In operation, the server node 240 passes the compressed stream data 226 including the stream data batches 226A and 226B to the data management services 270, which may then use compressed data batches as needed. Examples of the data management services 270 include, but are not limited to, recompression of the stream data batches for storage/archival and submission to other storage tiers of the cloud.

Figure 3:
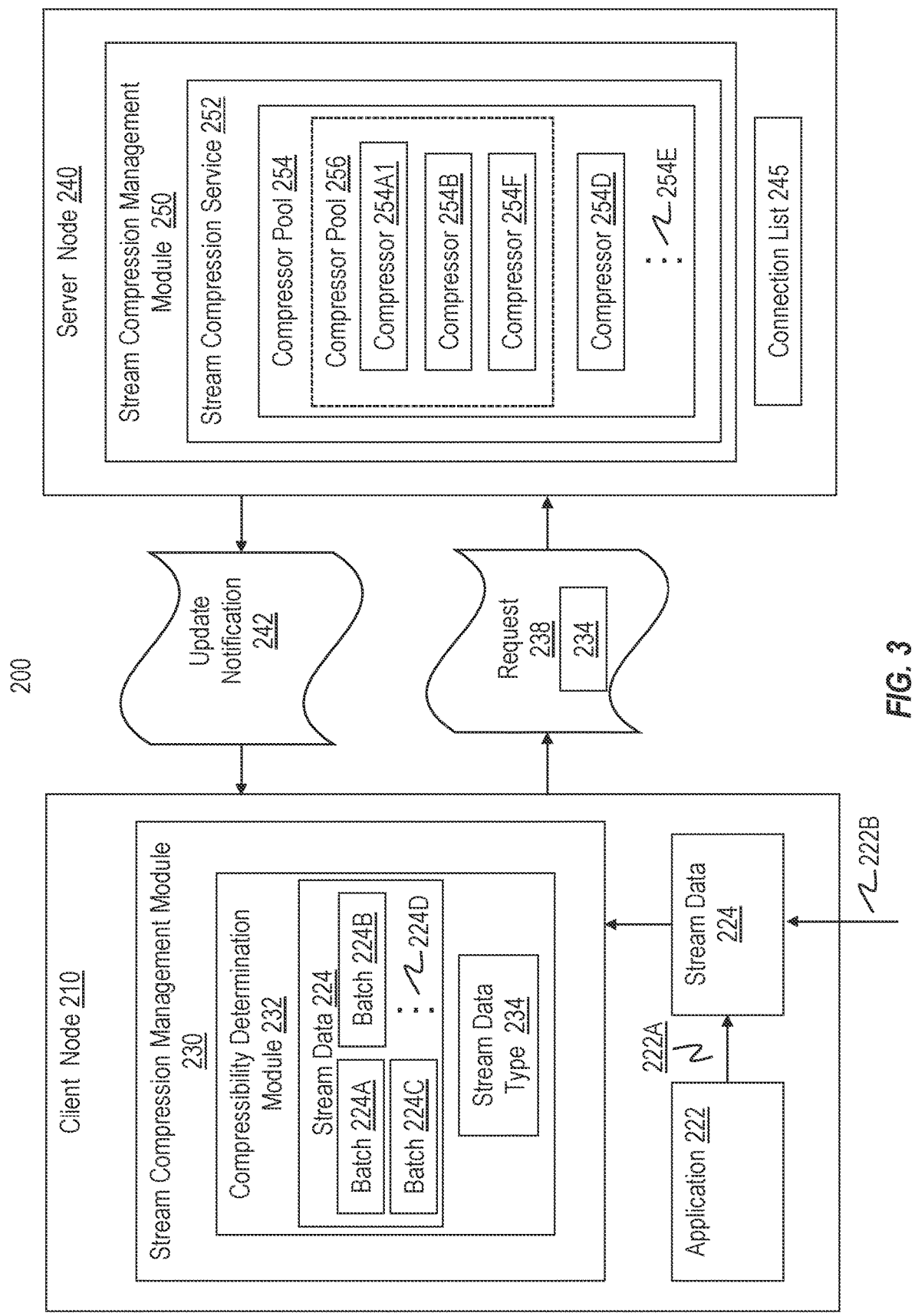
FIG. 3 illustrates an alternative embodiment of the stream data platform of FIGS. 2A-2C.

FIG. 3 illustrates an alternative embodiment of the stream data platform 200. As shown in FIG. 3, the stream compression service 252 has been updated. For example, compressor 254A has been updated and is now denoted as 254A1 to reflect the update. In addition, a new compressor 254F has been added to the compressor pool 254. In the embodiment, the new compressor 254F is one that is configured to compress the stream data type of the stream data batch 224A.

In the embodiment, the server node 240 maintains a connection list 245 that stores the stream data types of all client nodes where the steam compression service has been deployed. Accordingly, when the update to the stream compression service 252 has occurred, the server node 240 sends an update notification 242 to the client node 210 since the client node 210 has the stream data batch 224A that is supported by the compressor pool that has been updated. The server node 240 interrupts the compression and the stream data 224 is sent server node 240 without compression, with the flag 225 being set to zero to indicate no compression.

The data compression management module 230 then sends a new request 238 for the on-demand stream data service that includes the stream data type indicator 234. In response, the stream compression management module 250 extracts the stream data type indicator 234 and deploys the stream compression service 252 including the compressor pool 256 at the stream management module 230 as previously described. In this embodiment, the compressor pool 256 includes the updated compressor 254A1 and the new compressor 254F, along with the other compressors of the compressor pool 256 because these compressors are configured for compressing the stream data type of the stream data 224 including the stream data batch 224A. The stream data 224 including the stream data batch 224A can them be compressed by the stream compression service 252 in the manner previously described. Advantageously, by providing the stream compression service 252 on-demand to the client node 210, it reduces the computing system overhead needed to update and/or add new compressors to the compression pool of the stream compression service.

Figure 4:
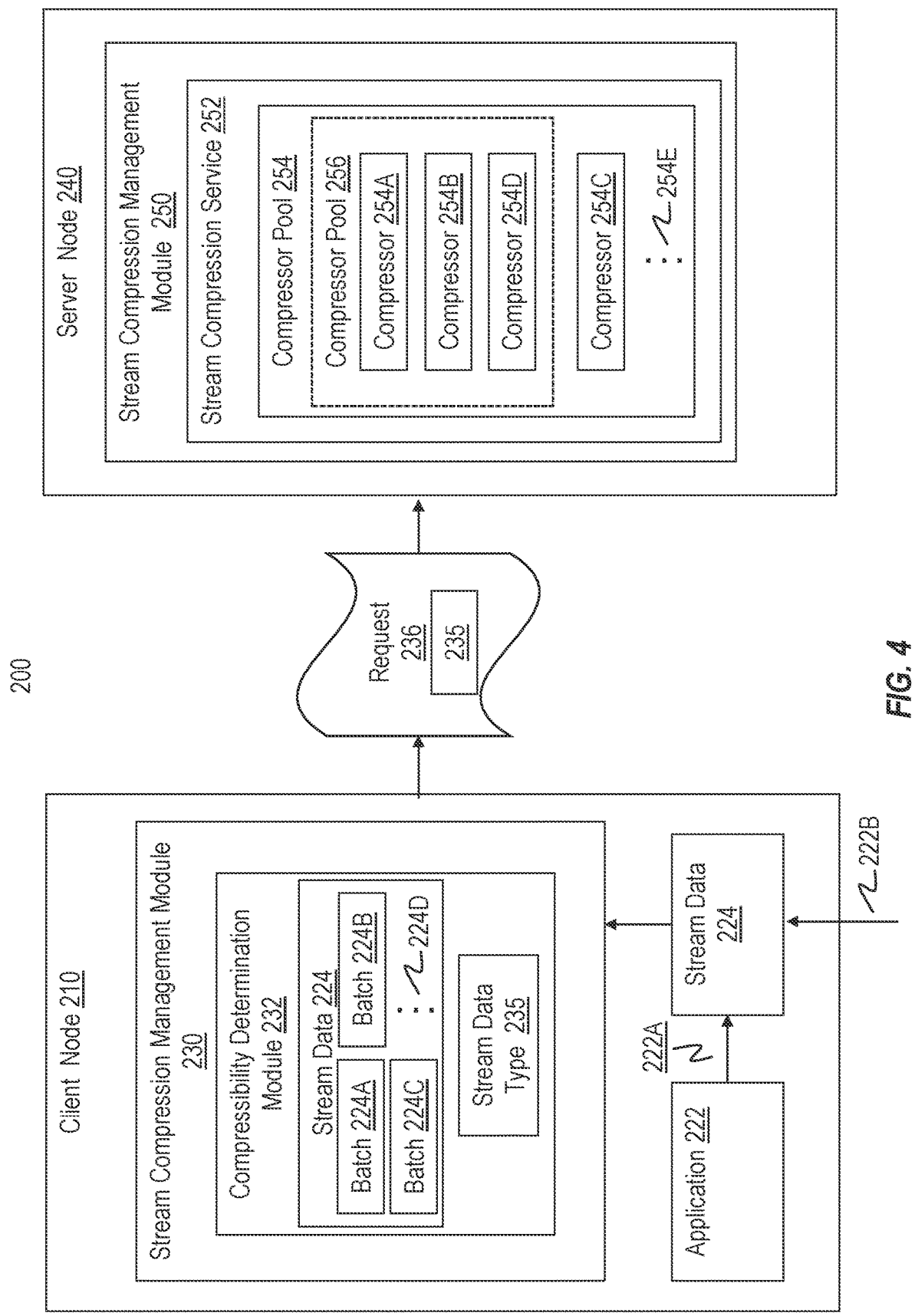
FIG. 4 illustrates an alternative embodiment of the stream data platform of FIGS. 2A-2C.

FIG. 4 illustrates an alternative embodiment of the stream data platform 200. In the embodiment of FIG. 4, the stream data type of the stream data 224 including the stream data batches 224A-224D has changed. For example, the stream data 224 may have changed from video data to image data or audio data. Accordingly, when it is determined that the stream data batches are compressible, the stream compression management module 230 sends a request 236 for the stream compression service that includes the stream data type indicator 235.

The request 236 is received by the stream compression management module 250 and the stream data type indicator 235 is extracted from the request. Based on the stream data type indicator 235, the stream compression management module 250 selects the compressors of the compressor pool 254 that are compatible with the stream data type of the stream data 224 including the stream data batches 224A-224D for inclusion in the compressor pool 256 that will be deployed along with the stream compression service in the manner previously described. In this embodiment, the compressor pool 256 includes the compressors 254A, 254B, and 254D. This is different from the compressor pool 256 of the embodiment of FIGS. 2A-2C, where the compressor 254C was included and the compressor 254D was not included. Accordingly, FIG. 4 shows the that in the present invention the compressors that are configured to compress/decompress a stream data type can dynamically change when the stream data type changes.

Example Methods

Figure 5:
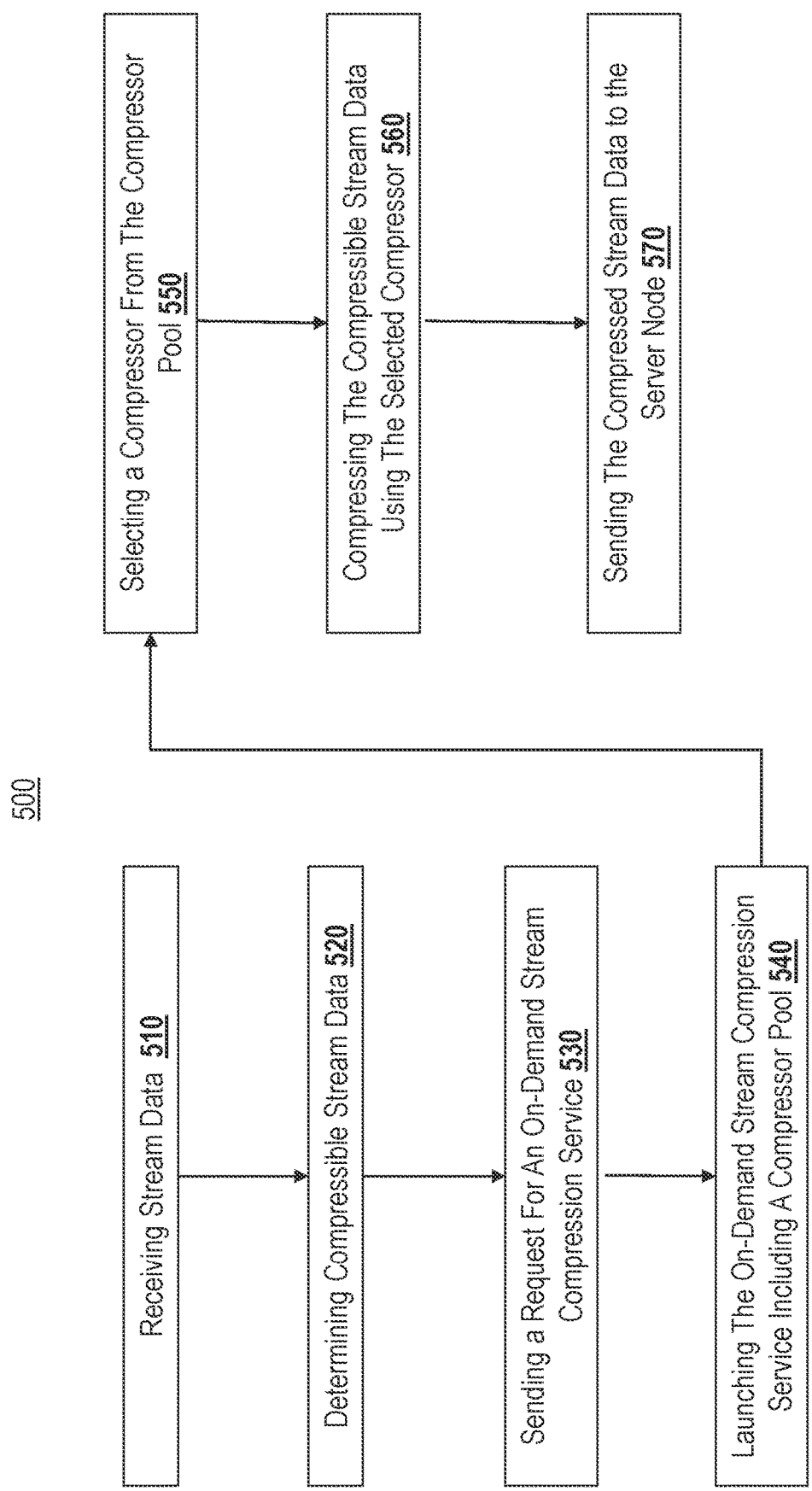
FIG. 5 illustrates an example method for a client node to use an on-demand stream compression service to compress stream data batches.
Figure 6:
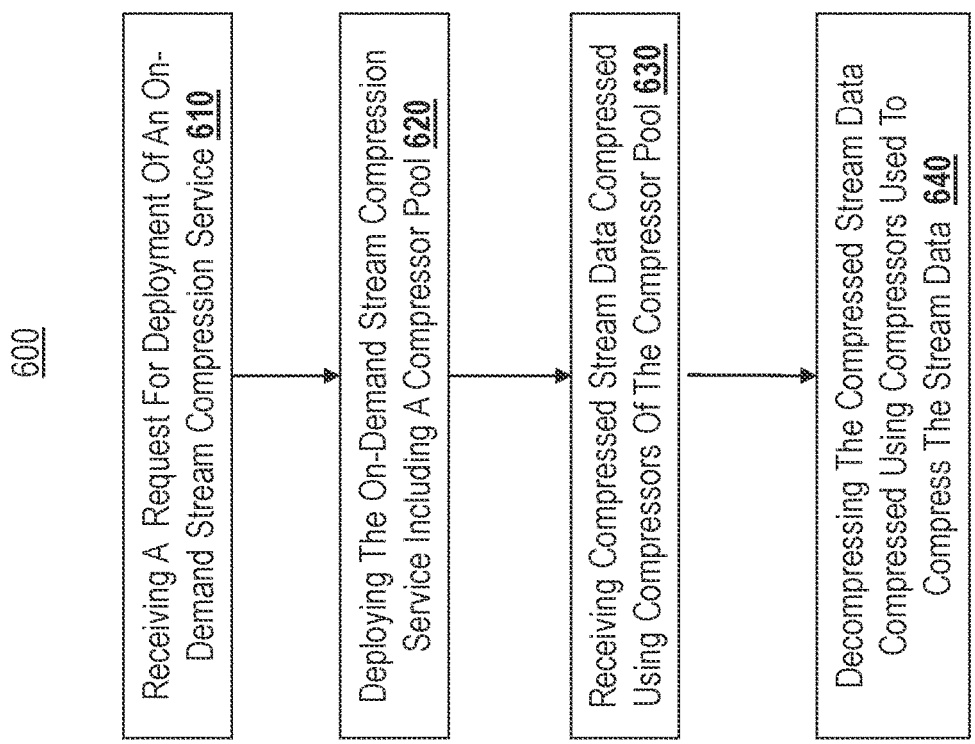
FIG. 6 illustrates an example method for a server node to deploy at a client server an on-demand stream compression service to compress stream data batches.

It is noted with respect to the disclosed methods, including the example methods of FIGS. 5 and 6, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 5, an example method 500 for a client node to use an on-demand stream compression service to compress stream data batches is disclosed. The method 500 will be described in relation to one or more of the figures previously described, although the method 500 is not limited to any particular embodiment.

The method 500 includes receiving at a client node one or more streams of data (510). For example, as previously described the client node 210 receives the stream data 224, which is some embodiments may be segmented into stream data batches 224A-224D.

The method 500 includes determining at the client node if the one or more streams of data are compressible (520). For example, as previously described the compressibility determination module 232 determines if the stream data 224 including the stream data batches 224A-224D are compressible.

The method 500 includes for those streams of data that are determined to be compressible, sending a request to a server node for an on-demand stream compression service, the request including an indicator of a stream data type for the compressible streams of data (530). For example, as previously described the stream compression management module 230 sends the request 236 that includes the stream data type indicator 234 to the server node 240. The server node 240 uses the stream data type indicator 234 to select the compressors of the compressor pool 256 that are able to compress the stream data batches that have the stream data type indicated by the stream data type indicator 234.

The method 500 includes launching a deployment by the server node of the on-demand stream compression service at the client node, the on-demand stream compression service including a compressor pool having one or more compressors that are configured to compress the stream data type of the compressible stream data batches (540). For example, as previously described the server node 240 deploys the stream compression service 252 at the client node 210 and the stream compression service 252 is launched. The stream compression service 252 includes the compressor pool 256 that has the compressors 254A, 254B, and 254C that are able to compress the stream data batches that have the stream data type indicated by the stream data type indicator 234.

The method 500 includes selecting at least one of the one or more compressors to compress at least one of the compressible streams of data (550). For example, as previously described the stream compression module 230 selects the compressor 254A to compress the stream data 224 including the stream data batch 224A.

The method 500 includes compressing the at least one compressible stream of data using the selected at least one or more compressors (560). For example, as previously described the compressor 254A compresses the stream data 224 including the stream data batch 224A.

The method 500 includes sending the compressed stream of data to the server node (570). For example, as previously described the stream compression module 230 sends the compressed stream data 226 including the stream data batch 226A to the server node 240.

Directing attention now to FIG. 6, an example method 600 for a server node to deploy at a client server an on-demand stream compression service to compress stream data batches is disclosed. The method 600 will be described in relation to one or more of the figures previously described, although the method 600 is not limited to any particular embodiment.

The method 600 includes receiving at a server node a request from a client node for deployment of an on-demand stream compression service configured to compress one or more streams of data that have been determined by the client node to be compressible, the request including an indicator of a stream data type for the one or more streams of data (610). For example, as previously described the server node 240 receives the request 236 having the stream data type indicator 234 from the client node 210. The request 236 request deployment of an on-demand stream compression service 252 that is able to compress stream data 224 including one or more of the stream data batches 224A-224D that have been determined by the client node 210 to be compressible.

The method 600 includes, in response to the request for the on-demand stream compression service, deploying the on-demand stream compression service at the client node, the on-demand stream compression service including a compressor pool having one or more compressors that are configured to compress the stream data type of the one or more streams of data (620). For example, as previously described the server node 240 deploys the stream compression service 252 at the client node 210. The stream compression service 252 includes the compressor pool 256 having the compressors 254A, 254B, and 254C that are able to compress the stream data batches that have the stream data type indicated by the stream data type indicator 234.

The method 600 includes receiving from the client node one or more compressed streams of data that have been compressed using one or more of the compressors of the compressor pool (630). For example, as previously described the server node 240 receives the compressed stream data 226 including the compressed stream data batches 226A and 226B from the client node 210.

The method 600 includes decompressing the one or more compressed streams of data using the one or more compressors of the compressor pool (640). For example, as previously described the stream compression management module 250 uses the compressor 254A to decompress the compressed stream data 226 including the compressed stream data batch 226A and uses the compressor 254C to decompress the compressed stream data 226 including the compressed stream data batch 226B.

E. FURTHER EXAMPLE EMBODIMENTS

Following are some further example embodiments of the invention. These are presented only by way of example and are not intended to limit the scope of the invention in any way.

Embodiment 1. A method, comprising: receiving at a client node one or more streams of data; determining at the client node if the one or more streams of data are compressible; for those streams of data that are determined to be compressible, sending a request to a server node for an on-demand stream compression service, the request including an indicator of a stream data type for the compressible streams of data; launching a deployment by the server node of the on-demand stream compression service at the client node, the on-demand stream compression service including a compressor pool having one or more compressors that are configured to compress the stream data type of the compressible streams of data; selecting at least one of the one or more compressors to compress at least one of the compressible streams of data; compressing the at least one compressible stream of data using the selected at least one or more compressors; and sending the compressed stream of data to the server node.

Embodiment 2. The method of embodiment 1, wherein the compressible streams of data that are sent to the server node include metadata that specifies the compressor that was selected to compress the compressible streams of data, compressor parameters of the selected compressor, and an indicator that compression has occurred.

Embodiment 3: The method of any of embodiments 1-2, wherein determining if a stream of data is compressible comprises determining whether a set of stream batches of data from the stream of data is compressible.

Embodiment 4: The method of any of embodiment 3, wherein if it is determined that none of the stream batches are compressible, the request for the compression service for the stream of data is not sent to the server node.

Embodiment 5: The method of any of embodiments 1-4, wherein the compressor pool is a subset of a second compressor pool of the on-demand compression service deployed at the server node.

Embodiment 6: The method of embodiments 1-5, wherein the selected at least one compressor is selected based on context, content and/or Service Level Agreement (SLA) constraints of the one or more streams of data.

Embodiment 7: The method of any of embodiments 1-6, wherein the on-demand stream compression service comprises a virtual machine or a container deployed at the client node.

Embodiment 8: The method of any of embodiments 1-7, wherein the selected at least one compressor is used to compress two or more of the compressible streams of data.

Embodiment 9: The method of any of embodiments 1-8, further comprising: selecting a second one of the one or more compressors; compressing a second one of the compressible streams of data, the second one of the compressible streams of data being different from the at least one compressible streams of data compressed by the selected at least one of the one or more compressors; and sending the second compressed stream of data to the server node.

Embodiment 10: The method of any of embodiments 1-9, wherein when the pool of compressors is updated, a new request for the on-demand stream compression service is sent to the server node.

Embodiment 11: The method of any of embodiments 1-10, where the one or more streams of data are received from an application located at the client node.

Embodiment 12: The method of any of embodiments 1-11, wherein the one or more streams of data batches are received from a source that is not part of the client node.

Embodiment 13: The method of any of embodiments 1-12, wherein, prior to launching the on-demand compression service, the client node sends the one or more streams of data to the server node as uncompressed streams of data.

Embodiment 14: A method comprising: receiving at a server node a request from a client node for deployment of an on-demand stream compression service configured to compress one or more streams of data that have been determined by the client node to be compressible, the request including an indicator of a stream data type for the one or more streams of data; in response to the request for the on-demand stream compression service, deploying the on-demand stream compression service at the client node, the on-demand stream compression service including a compressor pool having one or more compressors that are configured to compress the stream data type of the one or more streams of data; receiving from the client node one or more compressed streams of data that have been compressed using one or more of the compressors of the compressor pool; and decompressing the one or more compressed streams of data using the one or more compressors of the compressor pool.

Embodiment 15: The method of embodiment 14, further comprising: storing the decompressed streams of data in a memory cache of the server node.

Embodiment 16: The method of embodiments 14-15, wherein the compressed streams of data that are received by the server node include metadata that specifies the compressor that was used to compress the compressed streams of data, compressor parameters of the compressor, and an indicator that compression has occurred, and wherein the server node selects the compressor to use to decompress the compressed streams of data based on the metadata.

Embodiment 17: The method of embodiments 14-16, wherein the on-demand stream compression service comprises a virtual machine or a container deployed at the server node.

Embodiment 18: The method of embodiments 14-17, wherein the compressor pool is a subset of a second compressor pool of the on-demand compression service deployed at the server node.

Embodiment 19: The method of embodiment 18, wherein when the second compressor pool is updated or modified, a notification is sent to the client node.

Embodiment 20: The method of embodiments 14-19, wherein the notification is based on information included in connection list that specifies what compressors are being used by the client node.

Embodiment 21. A system, comprising hardware and/or software, operable to perform any of the operations, methods, or processes, or any portion of any of these, disclosed herein.

Embodiment 22. A non-transitory storage medium having stored therein instructions that are executable by one or more hardware processors to perform operations comprising the operations of any one or more of embodiments 1-13.

Embodiment 23. A non-transitory storage medium having stored therein instructions that are executable by one or more hardware processors to perform operations comprising the operations of any one or more of embodiments 14-20.

Example Computing Devices and Associated Media

Finally, because the principles described herein may be performed in the context of a computing system some introductory discussion of a computing system will be described with respect to FIG. 7. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
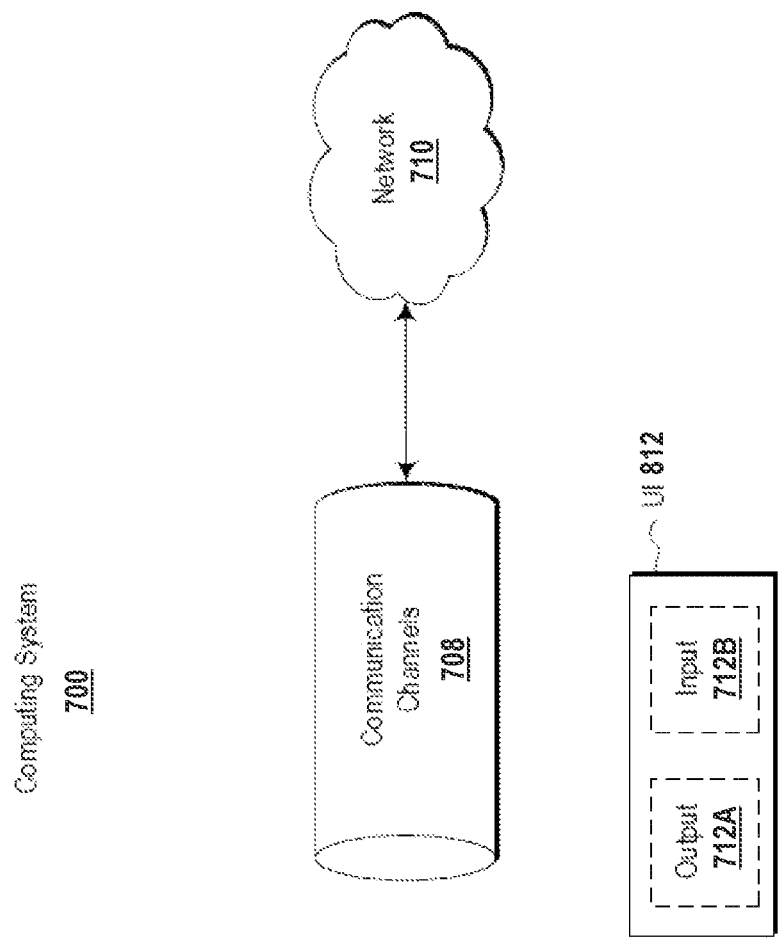
FIG. 7 illustrates an example computing system in which the embodiments described herein may be employed.

As illustrated in FIG. 7, in its most basic configuration, a computing system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 700 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 702 and memory 704, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving at a client node one or more streams of data;
   determining at the client node if the one or more streams of data are compressible;
   for those streams of data that are determined to be compressible, sending a request to a server node for an on-demand stream compression service, the request including an indicator of a stream data type for the compressible streams of data;
   launching a deployment by the server node of the on-demand stream compression service at the client node, the on-demand stream compression service including a compressor pool having one or more compressors that are configured to compress the stream data type of the compressible streams of data;
   selecting at least one of the one or more compressors to compress at least one of the compressible streams of data;
   compressing the at least one compressible stream of data using the selected at least one or more compressors; and
   sending the compressed stream of data to the server node.

2. The method of claim 1, wherein the compressible streams of data that are sent to the server node include metadata that specifies the compressor that was selected to compress the compressible streams of data, compressor parameters of the selected compressor, and an indicator that compression has occurred.

3. The method of claim 1, wherein determining if a stream of data is compressible comprises determining whether a set of stream batches of data from the stream of data is compressible.

4. The method of claim 3, wherein if it is determined that none of the stream batches are compressible, the request for the compression service for the stream of data is not sent to the server node.

5. The method of claim 1, wherein the compressor pool is a subset of a second compressor pool of the on-demand compression service deployed at the server node.

6. The method of claim 1, wherein the selected at least one compressor is selected based on context, content and/or Service Level Agreement (SLA) constraints of the one or more streams of data.

7. The method of claim 1, wherein the on-demand stream compression service comprises a virtual machine or a container deployed at the client node.

8. The method of claim 1, wherein the selected at least one compressor is used to compress two or more of the compressible streams of data.

9. The method of claim 1, further comprising:
   selecting a second one of the one or more compressors;
   compressing a second one of the compressible streams of data, the second one of the compressible streams of data being different from the at least one compressible streams of data compressed by the selected at least one of the one or more compressors; and
   sending the second compressed stream of data to the server node.

10. The method of claim 1, wherein when the pool of compressors is updated, a new request for the on-demand stream compression service is sent to the server node.

11. The method according to claim 1, where the one or more streams of data are received from an application located at the client node.

12. The method of claim 1, wherein the one or more streams of data are received from a source that is not part of the client node.

13. The method of claim 1, wherein, prior to launching the on-demand compression service, the client node sends the one or more streams of data to the server node as uncompressed streams of data.

14. A method comprising:
receiving at a server node a request from a client node for deployment of an on-demand stream compression service configured to compress one or more streams of data that have been determined by the client node to be compressible, the request including an indicator of a stream data type for the one or more streams of data;
in response to the request for the on-demand stream compression service, deploying the on-demand stream compression service at the client node, the on-demand stream compression service including a compressor pool having one or more compressors that are configured to compress the stream data type of the one or more streams of data;
receiving from the client node one or more compressed streams of data that have been compressed using one or more of the compressors of the compressor pool; and
decompressing the one or more compressed streams of data using the one or more compressors of the compressor pool.

15. The method of claim 14, further comprising:
storing the decompressed streams of data in a memory cache of the server node.

16. The method of claim 14, wherein the compressed streams of data that are received by the server node include metadata that specifies the compressor that was used to compress the compressed streams of data, compressor parameters of the compressor, and an indicator that compression has occurred, and
wherein the server node selects the compressor to use to decompress the compressed streams of data based on the metadata.

17. The method of claim 14, wherein the on-demand stream compression service comprises a virtual machine or a container deployed at the server node.

18. The method of claim 14, wherein the compressor pool is a subset of a second compressor pool of the on-demand compression service deployed at the server node.

19. The method of claim 18, wherein when the second compressor pool is updated or modified, a notification is sent to the client node.

20. The method of claim 19, wherein the notification is based on information included in connection list that specifies what compressors are being used by the client node.

* * * * *